(12) United States Patent
Zern et al.

(10) Patent No.: US 10,697,808 B2
(45) Date of Patent: Jun. 30, 2020

(54) METHOD FOR OPERATING A MAGNETOSTRICTIVE POSITION MEASURING DEVICE

(71) Applicant: Balluff GmbH, Neuhausen a.d.F. (DE)

(72) Inventors: Achim Zern, Heilbronn (DE); Tobias Rupp, Stuttgart (DE); Sándor Páli, Veszprém (HU)

(73) Assignee: Balluff GmbH, Neuhausen a.d.F. (DE)

(*) Notice: Subject to any disclaimer, the term of this patent is extended or adjusted under 35 U.S.C. 154(b) by 158 days.

(21) Appl. No.: 16/034,620

(22) Filed: Jul. 13, 2018

(65) Prior Publication Data

US 2019/0017851 A1   Jan. 17, 2019

(30) Foreign Application Priority Data

Jul. 14, 2017   (DE) .......................... 10 2017 115 961

(51) Int. Cl.
*G01D 5/48*   (2006.01)

(52) U.S. Cl.
CPC .................................. *G01D 5/485* (2013.01)

(58) Field of Classification Search
CPC ................................. G01D 5/48; G01D 5/485
USPC .......................................... 324/207.13, 225
See application file for complete search history.

(56) References Cited

FOREIGN PATENT DOCUMENTS

| DE | 28 37 014 A1 | 2/1980 |
|---|---|---|
| DE | 10 2010 008 495 A1 | 8/2011 |
| EP | 1 306 650 A1 | 5/2003 |
| EP | 1 691 173 A1 | 8/2006 |

OTHER PUBLICATIONS

German Office Action in DE 10 2017 115 961.4, dated Mar. 2, 2018, with English translation of relevant parts.

*Primary Examiner* — Farhana A Hoque
*Assistant Examiner* — Courtney G McDonnough
(74) *Attorney, Agent, or Firm* — Collard & Roe, P.C.

(57) ABSTRACT

A method for operating a magnetostrictive displacement measuring device, having a wave guide for guiding at least one mechanical wave, at least one damping zone, a magnetic position encoder which is displaceably arranged along a measuring range of the position measuring device and a detection unit, generates the at least one mechanical wave by an excitation signal (IP) having a clock frequency ($f_1$, $f_2$), at least two mechanical waves having respectively different clock frequencies ($f_1$, $f_2$, f) being generated. The clock frequencies can be predetermined such that interfering reflections ($R_{11}$, $R_{12}$) occur at different positions ($x_{11}$, $x_{21}$, $x_2$) of the measuring range of the displacement measurement device, and during the method of the position encoder, switching between the different clock frequencies ($f_1$, $f_2$, f) takes place, such that the interfering reflections ($R_{11}$, $R_{12}$) on the respective different positions ($x_{11}$, $x_{21}$, $x_{22}$) of the measuring range are masked out.

22 Claims, 12 Drawing Sheets

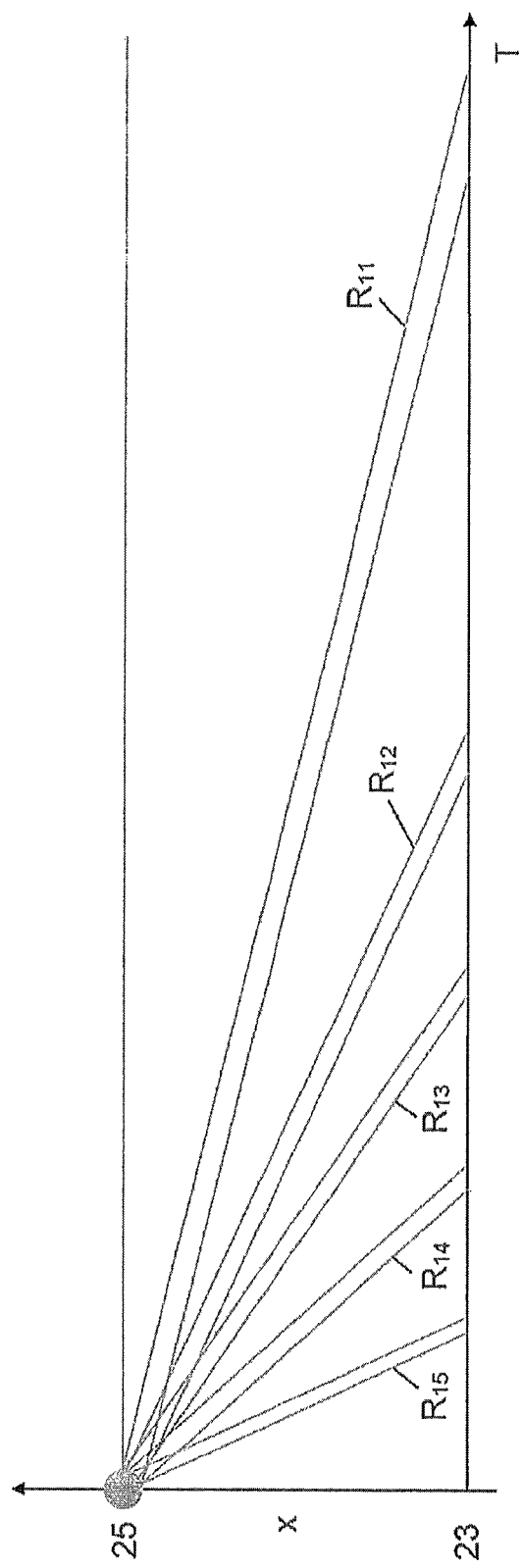

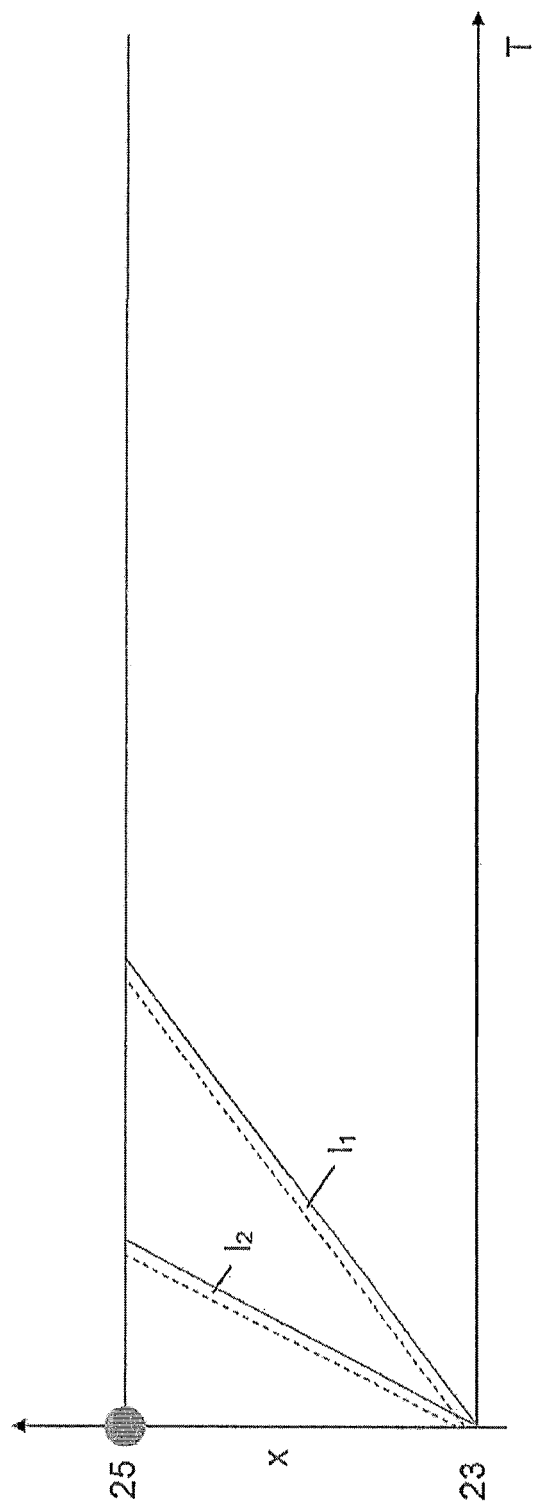

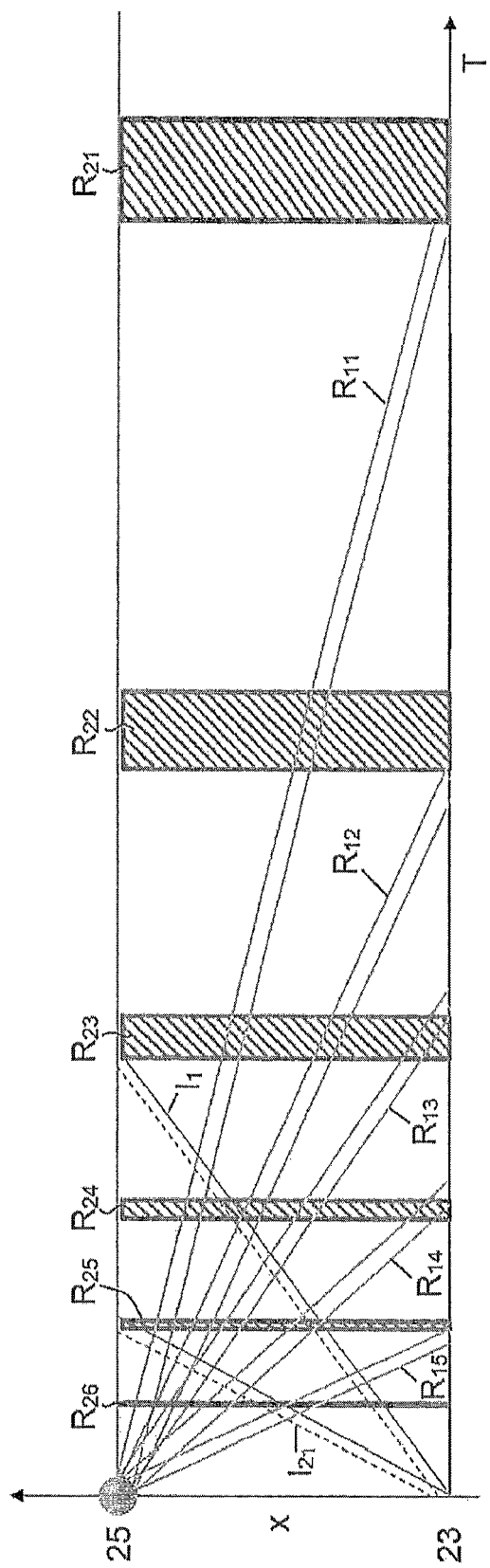

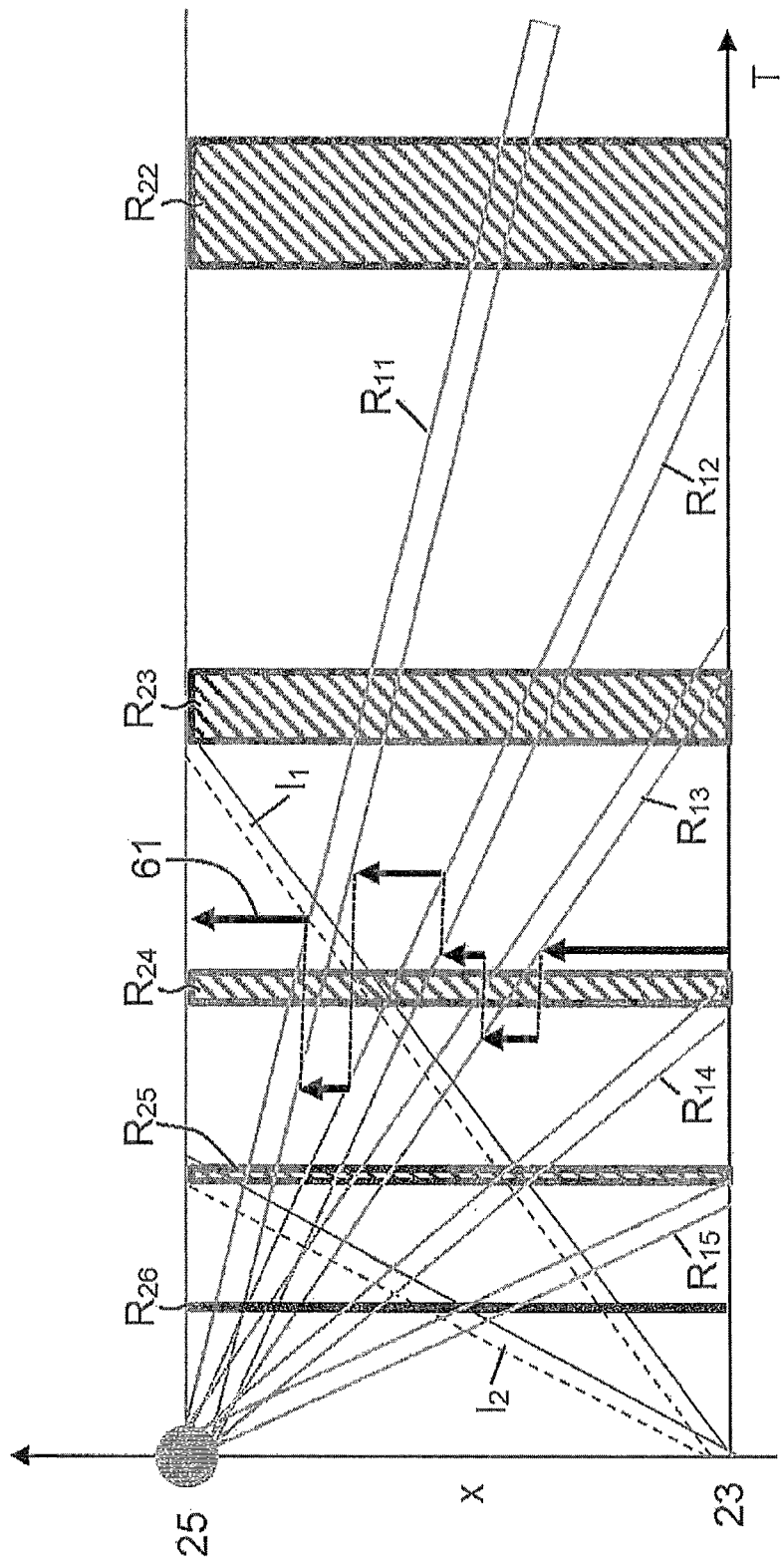

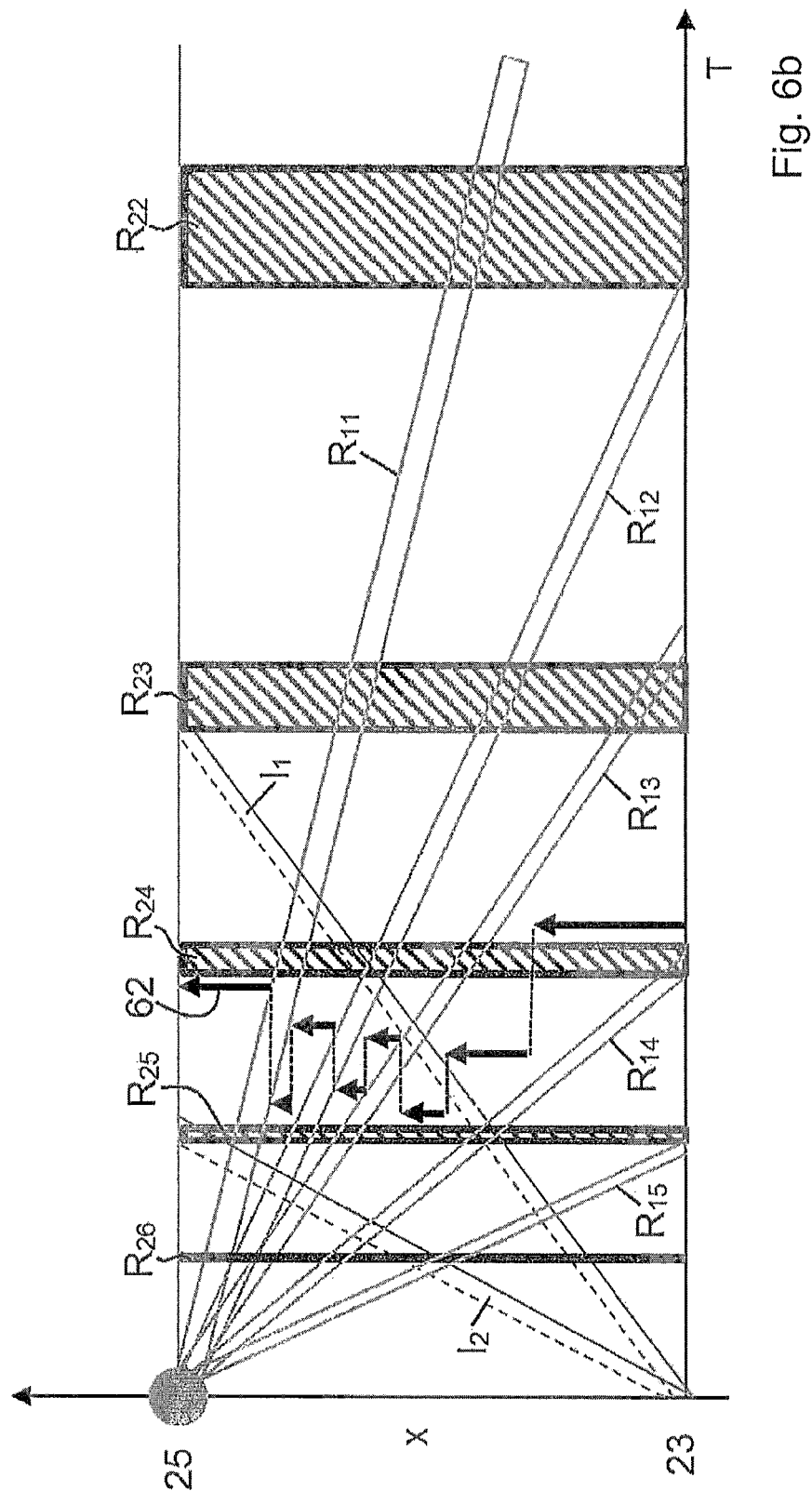

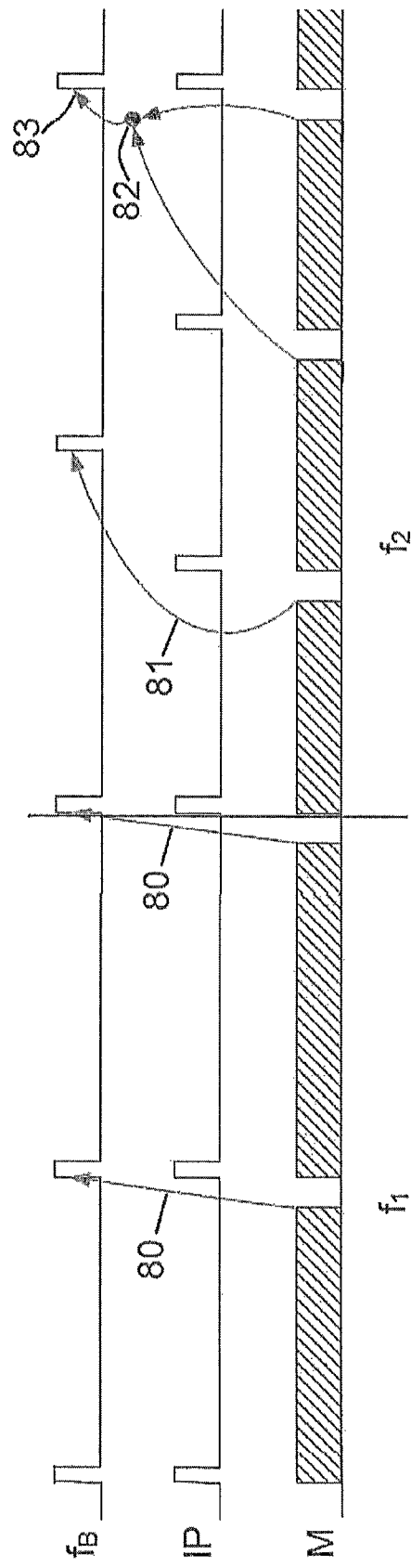

METHOD FOR OPERATING A MAGNETOSTRICTIVE POSITION MEASURING DEVICE

CROSS REFERENCE TO RELATED APPLICATIONS

Applicant claims priority under 35 U.S.C. § 119 of German Application No. 10 2017 115 961.4 filed Jul. 14, 2017, the disclosure of which is incorporated by reference.

BACKGROUND OF THE INVENTION

1. Field of the Invention

The present invention relates to a method for operating a magnetostrictive position measuring device. Furthermore, the invention relates to a computer program which performs each step of the method when it runs on a computing device, as well as a machine-readable storage medium which stores the computer program. Finally, the invention relates to a computing device which is configured to perform the method according to the invention.

2. Description of the Related Art

From the EP 1 306 650 A1 and the DE 10 2010 008 495 A1 a contactless and absolute measuring or linearly measuring magnetostrictive position measuring device is known. The measuring devices described there comprise a firmly arranged waveguide, a magnetic position encoder which is moveably arranged relative to the waveguide and a detection unit which is formed by a receiving coil and which is firmly arranged on the waveguide, which converts mechanical torsional oscillations of the waveguide into an electrical signal. The waveguide, e.g. a tube made of a magnetostrictive iron-nickel alloy, comprises a current-carrying line threaded therein, e.g. a copper wire. Here, the magnetic position encoder comprises a number, e.g. four, of permanent magnets. It is to be noted that said tube made of a magnetostrictive iron-nickel alloy can also be implemented in the form of a so-called waveguide wire.

An electronic control system generates a current pulse by means of an excitation signal having a temporally constant clock frequency, said current pulse being applied to the above-mentioned current-carrying line, whereby a magnetic field is generated which is directed circularly around the waveguide. This circularly directed magnetic field overlaps with an axially directed static magnetic field generated by the position encoder. By overlapping the two magnetic fields, a torsional impulse and thus a mechanical wave propagating on both sides of the waveguide arise by means of magnetostriction of the waveguide. The wave running towards the detection unit induces an electrical signal there by reversal of the magnetostrictive effect. The time required between the forming of the torsional impulse and the inducing of the electrical signal is a measure for the length of travel between the position encoder and the detection unit.

The wave running towards the end of the waveguide is damped there by means of a damping zone. The damping of the mechanical wave is typically between 90% and 96% during a single pass. Therefore, a damped wave continues to remain after the damping which is reflected at the end of the waveguide and propagates in turn in the waveguide. Consequently, the wave must pass through the damping zone several times until its influence on measurements is almost non-existent. Prior to this, during repeated measurement and an unfavourable combination of the clock frequency and the length of the measuring range at the position of the position encoder, the reflected wave can overlap with the torsional impulse and thus distort the measuring result. Moreover, the wave running towards the detection unit is likewise reflected there and passes through the waveguide. When arriving at the other end of the waveguide, it is similarly damped and reflected. This portion of the wave can likewise influence the measuring result. In order to counteract the influence of the reflected waves, the measurements are conventionally carried out with a clock frequency which is upwardly limited. The wave can thus run through the damping several times before a new measurement is triggered.

SUMMARY OF THE INVENTION

The invention relates to a method for operating a magnetostrictive position measuring device, having a waveguide for guiding at least one mechanical wave, having at least one damping zone, having a magnetic position encoder which is displaceably arranged along a measuring range of the position measuring device and having a detection unit. The at least one mechanical wave is generated by an excitation signal having a clock frequency. Preferably, the at least one mechanical wave is generated in the following manner but is not, however, limited to this manner of generation: A current impulse is introduced into the waveguide by means of a wire contacting the waveguide, whereby a circular magnetic field is generated in and around the waveguide. The magnetic position encoder at the position to be measured has at least one magnet, preferably a permanent magnet, whose magnetic field is at a right-angle to the circular magnetic field. Consequently, the two magnetic fields overlap at least at the position of the position encoder, such that a torsional impulse is generated by magnetostriction, which in turn generates the at least one mechanical wave.

Magnetostriction is known to align magnetic domains within a material in the same direction by applying of an external field. The magnetic dipoles of the material are thus aligned such that, for example, their longitudinal axes are parallel to the direction of the external field. As a result, a change in the length of the material takes place. This is referred to as magnetostrictive effect. In the magnetostrictive position measuring device described above, the underlying effect is of a torsional nature, for which reason the Wiedemann effect is also discussed.

The mechanical wave propagates from both sides of the position encoder. A mechanical wave running towards the detection unit generates an electrical signal in the detection unit by reversal of the magnetostrictive effect. In particular with torsional propagation, this is also called the Mateucci effect. The electrical signal can be evaluated by the detection unit. For this purpose, the detection unit can preferably comprise a coil which is arranged around the waveguide. Alternatively, the detection unit can comprise a strip arranged vertically on the waveguide, around which a coil is arranged, or a piezoelectric measuring element. Other types of detection unit are also possible. The position of the position encoder is concluded from the time of travel of the mechanical wave with a known propagation speed. A mechanical wave running towards the damping zone is damped there by means of the damping zone, although not fully, whereby the mechanical wave is reflected on the damper side end of the waveguide. The two reflections described can have an interfering influence on the measurement.

The reflections originating from the damper side end move in the opposite direction to the direction of movement of the position encoder and overlap with the measurement signal at specific overlap positions. The distance between the position encoder and the damping zone is known, such that the path of travel and therefore the time of travel of the mechanical wave between the damping zone and the position encoder can thus be determined and thus the overlap positions can be concluded. In contrast, the reflections originating from the detector side end move synchronously with the direction of movement of the position encoder. At specific clock frequencies, at specific positions in the measuring range, there are overlaps of actual measurement signals with the reflections which arise with a preceding measurement and propagate through the waveguide. These specific clock frequencies, at which these reflections would overlap with the measurement signal, must consequently be excluded.

According to the invention, it is now provided that at least two mechanical waves having respectively different clock frequencies are generated. The clock frequencies can be predetermined such that interfering reflections which arise during one of the preceding measurements occur at different overlap positions of the measuring range of the position measuring device and at no point in time, and at no position in the measuring range, is there an overlap of the actual measurement signal with an interfering reflection. In particular, the clock frequencies with which the at least two mechanical waves are generated are selected such that the overlap position(s) of the interfering reflection(s) of at least one clock frequency is/are outside one of at least two position ranges and the overlap position(s) of the interfering reflection(s) of at least one other clock frequency is/are outside another one of the at least two position ranges, wherein the at least two position ranges generally cover the measuring range entirely.

While the magnetic position encoder is displaced along the measuring range, position-dependent switching takes place between the different clock frequencies, such that the interfering reflections on the respective different overlap positions of the measuring range are masked out. In other words, the clock frequency at whose reflection the overlap position is outside this position range and thus is masked out is used within the at least one position range, and, when the magnetic position encoder leaves this position range in course of its displacement, is switched to the clock frequency at whose reflection the overlap position is outside the adjoining position range and this is thus masked out. It should be noted that the term "switching" of clock frequencies can also be understood here as switching off, switching on, suppressing, selecting and similar.

Because the reflections for the respective clock frequencies overlap with the measurement signal at fixed overlap positions within the measuring range, in an advantageous manner switch-over points of the measuring range, at which switching between the at least two different clock frequencies takes place, can be assigned to corresponding clock frequencies. In other words, the overlap positions of the reflections on the measuring range corresponding to the respective clock frequencies are predetermined. The switch-over points can then be assigned to the corresponding clock frequencies based on these overlap positions, such that the overlap positions are masked out by means of the switching. Therefore, a calibration during which the overlap positions are measured is not necessary.

According to one aspect, this assignment of the switch-over points to the corresponding clock frequencies can be determined from a functional relationship. The overlap positions of the wave running towards the damping zone can be calculated for various frequencies via the following formula 1:

$$x_n = -\left(\frac{n}{2}\right) \cdot v \cdot \frac{1}{f} + L \qquad \text{(Formula 1)}$$

Here, $x_n$ represents the overlap position for a reflection which emerges from the n-th previous measurement with the actual measurement signal, v specifies the propagation speed of the mechanical wave and f the clock frequency. L, in turn, defines the length of the measurement section. Here, furthermore, the usual case that the reflections are not only at a discrete frequency but rather cover a frequency band can be taken into account by a width around the respective overlap positions being assigned to the reflections. The width around the overlap positions represents the distribution of the possible overlap positions, also called width distribution, due to the non-discrete frequency band. The switch-over points are thus selected such that the overlap positions, including the widths assigned to the reflections, are masked out.

On the other hand, the wave running towards the detection unit runs synchronously with the measurement signal of the position encoder. Consequently, reflections resulting therefrom can overlap with the torsional impulse at specific clock frequencies over the entire measuring range. Clock frequencies which avoid or exclude this can be calculated using the following formula 2:

$$\frac{1}{f_{vn}} = \left(\frac{1}{n}\right) \cdot \frac{2L}{v} \qquad \text{(Formula 2)}$$

Here, $f_{vn}$ represents the clock frequency to be excluded for a reflection which arises from the n-th preceding measurement, with the actual measurement signal. Similarly, v specifies the propagation speed of the mechanical wave and L the length of the measurement section.

According to another aspect, the assignment of the switch-over points to the corresponding clock frequencies can be read out from a table. Preferably, this table is a look up table. According to yet another aspect, the assignment of the switch-over points to the corresponding clock frequencies can be determined by means of a diagram.

According to another aspect, the assignment of the switch-over points to the corresponding clock frequencies can be determined by a calibration of the magnetostrictive position measuring device before a measurement. In doing so, the reflections can be measured directly on the measuring section. Alternatively, a position-frequency plane can be detected by means of a calibration device by a screening process and thus the switch-over points can be determined. The calibration can be performed in different ways. On the one hand, each magnetostrictive position measuring device can be individually calibrated with the calibration device. On the other hand, across-the-board calibrations depending on type, length, use, etc. of the position measuring device can be carried out. Finally, self-calibrations of the magnetostrictive position measuring device can also be provided, wherein, here, interfering reflections can be recognized independently according to the method and these can be masked out.

Data obtained with the calibration, in-particular the site-frequency plane, can additionally be used to create the table and/or the diagram for assignment. This is especially advantageous when switching between several clock frequencies takes place.

According to one aspect, the assignment of the respective switch-over points to the corresponding clock frequencies is determined by means of an algorithm.

In general, a switching hysteresis can be provided during the assignment of the switch-over points. This means that the switch-over points are selected at a slightly larger position when the position encoder is displaced in the direction of larger positions, and the switch-over points are selected at a slightly smaller position when the position encoder is displaced from larger positions in the direction of smaller positions. It is thus achieved that switching between the clock frequencies is prevented from taking place constantly when the position encoder is located exactly at one of the switch-over points, although the position encoder does not move.

Generally, switching can take place from a first clock frequency both to a larger second clock frequency and to a smaller second clock frequency during switching of the clock frequencies. However, advantageously, switching takes place from a first clock frequency to a second clock frequency that is preferably larger than the first clock frequency. This has the advantage that, in general, higher clock frequencies are achieved over the entire measuring range.

Preferably, an initial interference is taken into consideration during the selection of the clock frequencies. Thus, the case that a mechanical wave which is triggered during a previous measurement comes into the detector not concurrently with a new current impulse for a mechanical wave of the current measurement, because the detector is "blocked" by the new electrical impulse at this moment, is taken into consideration. Such a measuring situation can also be taken into account by the method according to the invention.

For the case which occurs, in particular, with high clock frequencies, that several interfering reflections occur at positions of the measuring range of the position measuring device, further clock frequencies are provided between which switching takes place. Thus, measurements with a higher clock frequency can also be carried out in the presence of a plurality of interfering reflections.

The first clock frequency is preferably in a range of $$\frac{v}{L} > f_1 > \frac{v}{2L}.$$

These limits arise from formula 2 for the values n=1 and n=2, which arise from the overlap of the actual measurement signals with the reflections which arose one (n=1) measurement previously or two (n=2) measurements previously. Here, the wave running towards the detection unit from formula 2 is used. Here, also, L represents the length of the measurement section of the magnetostrictive displacement measurement device, and v represents the speed of the mechanical wave. In this frequency range, only one interfering reflection of the wave running towards the damping zone is to be expected. More preferably, the first clock frequency is closer to $$\frac{v}{L}$$

than to $$\frac{v}{2L},$$

in order to obtain a maximum first clock frequency within this frequency range. Furthermore, a safety range between the first clock frequency and $$\frac{v}{L}$$

is preferably provided in order to ensure that the first clock frequency does not coincide with the widened reflection of the wave running towards the detection unit.

The second clock frequency is, preferably, in a frequency range of $$\frac{3v}{2L} > f_2 > \frac{v}{L}.$$

These limits arise similarly from formula 2 for the values n=2 and n=3, which arise from two (n=2) or three (n=3) measurements previously. Here, likewise, the wave running towards the detection unit from formula 2 is used. In this frequency range, two interfering reflections of the wave running towards the damping zone are to be expected. More preferably, the second clock frequency is closer to $$\frac{3v}{2L}$$

than to $$\frac{v}{L},$$

in order to obtain a maximum second clock frequency within this frequency range. Most preferably, the second clock frequency is 1.5 times the first clock frequency. Furthermore, a safety range between the second clock frequency and $$\frac{3v}{2L}$$

is preferably provided.

This combination of the frequency ranges for the first clock frequency and the second clock frequency is designed to be especially advantageous, as, here, two clock frequencies are sufficient, between which switching must take place once and switching back must take place once, in order to cover the entire measuring range without the measurement signal overlapping with reflections.

The measured values detected at all clock frequencies can preferably be added up, saved and output in a bus-synchronous manner, such that they can be transmitted by a bus or a bus system.

Optionally, when using a bus or a bus system for outputting the measurement data, in the case that the second clock frequency is larger than a clock rate of the bus, the measurement can be averaged. It can be provided that a measurement value which has been averaged in this way is output only in a delayed manner, during the next clocking of the bus, wherein the delay can be achieved, for example, by a waiting time. Thus, the bus can be operated both at the first clock frequency and at the second clock frequency with a uniform clock rate.

The computer program is set up to carry out each step of the method, in particular when it is carried out on a computing device or a control device. It enables the implementation of the method in a conventional electronic control device, without needing to make structural changes thereto. For this purpose, it is saved on a machine-readable storage medium.

By installing the computer program on a conventional electronic control device, the electronic control device which is configured to operate the magnetostrictive displacement measurement device is obtained.

BRIEF DESCRIPTION OF THE DRAWINGS

Exemplary embodiments of the invention are depicted in the drawings and described in more detail in the following description.

FIG. 4a shows a diagram of the position of a position encoder over a period, in which the overlap positions of an actual measurement signal and of the reflections of the wave running towards the damping zone are recorded.

FIG. 4c shows a diagram of the position of the position encoder over the period, in which the overlap positions of the actual measurement signal and initial interferences of the previous measurements are recorded.

FIG. 4d shows a combination of the diagrams 4a to 4c in a common diagram.

FIG. 6a shows the switching between six clock frequencies according to a second embodiment of the invention, depicted again on the basis of the diagram from FIG. 4d.

FIG. 6b shows the switching between eight clock frequencies according to a third embodiment of the invention, depicted again on the basis of the diagram from FIG. 4d.

FIG. 8 shows, in a diagram, the driving of the magnetostrictive position measuring device from FIG. 1 by a bus clock and an internal clock of the magnetostrictive measuring device for an initial pulse with the first clock frequency and the second clock frequency.

DETAILED DESCRIPTION OF PREFERRED EMBODIMENTS

Figure 1:
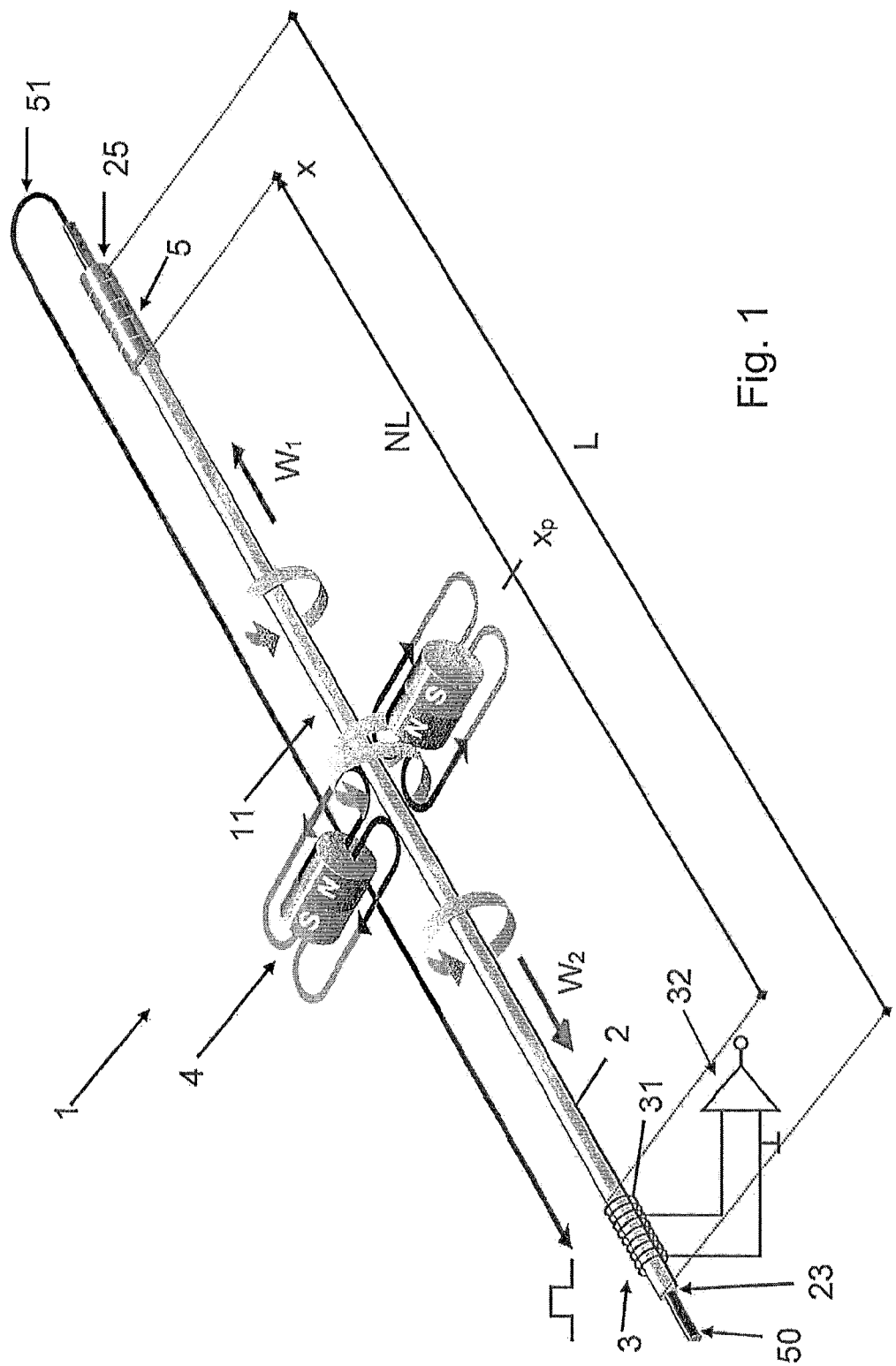
FIG. 1 shows an isometric view of a magnetostrictive position measuring device which can be controlled by means of an embodiment of the method according to the invention.

The magnetostrictive position measuring device 1 shown in FIG. 1 comprises a waveguide 2 which serves as a measurement section. A detection unit 3 is arranged on one end 23 of the waveguide 2. In the exemplary embodiment depicted, the detection unit 3 has a coil 31 which is arranged axially around the waveguide 2 and an evaluation circuit 32 which is depicted in FIG. 1 only in a simplified manner. In a further exemplary embodiment which is not depicted, a vertical strip is arranged on the end 23 of the waveguide 2 and a coil is arranged around this strip. In a further embodiment which is likewise not depicted, a piezoelectric measuring element is arranged on the end 23 of the waveguide 2. The waveguide 2 is supplied with a short current impulse which is introduced therein via an input contact 50. A circular magnetic field is generated by the current flow in the waveguide 2, said magnetic field being converged within the waveguide 2. This is also referred to as initial pulse IP. The current flows back again via an output contact 51. Furthermore, the magnetostrictive position measuring device 1 comprises a magnetic position encoder 4 via which the position x within the measurement section can be determined. In this embodiment, the magnetic position encoder 4 has two permanent magnets 41, 42. In further embodiments, the position encoder 4 can also have a plurality of permanent magnets or consist of a homogeneous magnetic material. At the position x to be measured of the position encoder 4, a magnetic field originates from the permanent magnets 41, 42, the magnetic field lines of said magnetic field being at a right angle to the circular magnetic field generated by the initial pulse IP. The magnetic fields of the permanent magnets 41, 42 and the circular magnetic field overlap at least at the position x of the position encoder 4, such that a torsional impulse is generated by magnetostriction, which in turn generates mechanical waves $W_1$, $W_2$ with a clock frequency f. In this course, switching can take place between the clock frequencies f which are used.

A first mechanical wave $W_1$ propagates in the direction of a damping zone 5 which is on the opposite end 25 of the detection unit 3 on the waveguide 2. There, the first mechanical wave $W_1$ is damped, wherein, at least with a first pass through the damping zone, the damping is not sufficient to reduce the amplitude of the first mechanical wave $W_1$ to such an extent that it does not have any influence on the measurement. Instead, the first mechanical wave $W_1$ is reflected at the end 25 of the damping zone 5 or the waveguide 2, which is subsequently explained in detail. A second mechanical wave $W_2$ propagates in the direction of the detection unit 3. In reversing the magnetostrictive effect, an electrical signal is generated from the second mechanical wave $W_2$ at the coil 31 of the detection unit 3. In a further embodiment, the second mechanical wave $W_2$ is discharged on the vertical strip, before an electrical signal is generated on a coil arranged around the strip. In yet another embodiment, a piezoelectric measuring element is used which detects the second mechanical wave $W_2$ and converts it into an electrical signal. In other embodiments, further detection units 3 are possible. The electrical signal generated is then evaluated by the evaluation circuit 32 of the detection unit 3.

The propagation speed of the mechanical waves $W_1$, $W_2$ within the waveguide 2 is known and largely constant, even with respect to environmental influences such as temperature, shock, contamination etc. In the exemplary embodiments described in the following, the propagation speed is in a range between 2700 m/s and 2900 m/s, e.g. at 2830 m/s. Consequently, the position x of the position encoder 4 can be determined from the time of travel of the second mechanical wave $W_2$. As explained in the following, the second mechanical wave $W_2$ is reflected at the end 23 of the waveguide 2 on which the detection unit 3 is arranged.

A measuring range 11 of the magnetostrictive position measuring device 1 is between the detection unit 3 and the damping zone 5 and specifies over which positions x the position encoder 4 can be displaced and thus can be measured. The length of the measuring range 11, i.e. the distance between the detection unit 3 and the damping zone 5 is referred to as nominal length NL. In the following exemplary embodiments, when not described otherwise, a nominal length NL of 500 mm is assumed. A length L of the waveguide 2 specifies the distance between the two ends 23, 25 of the waveguide 2 and results from the nominal length NL by the length of the coil 31 on the waveguide 2 (or the length of the vertical strip or the length of the piezoelectric measuring element) and the length of the damping zone 5 being added to the nominal length NL. The usable measuring range 11 characterized by the nominal length NL is smaller than the length L of the waveguide 2. This is caused by various influencing factors. This includes, for example, the length of the coil 31 (or the length of the vertical strip or the length of the piezoelectric measuring element) and the length of the damping zone 5, as well as the width of the magnetic field generated by the position encoder 4. For the following embodiments, a total value of 80 mm is assumed for these factors.

In the exemplary embodiments of the invention, only first order reflections are considered, because reflections of the second order already have merely a negligible interfering influence on the measurement. Accordingly, reflections in the following refer only to first order reflections. It should however be noted that the invention is not limited to first order reflections, but rather can likewise be correspondingly used with higher order reflections.

Figure 2A:
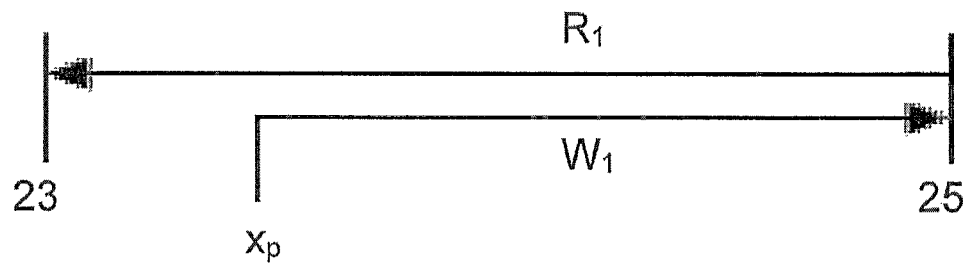
FIG. 2a schematically shows a path of a reflection of a wave which runs towards a damping zone, said path being arranged within the magnetostrictive position measuring device according to FIG. 1.
Figure 2B:
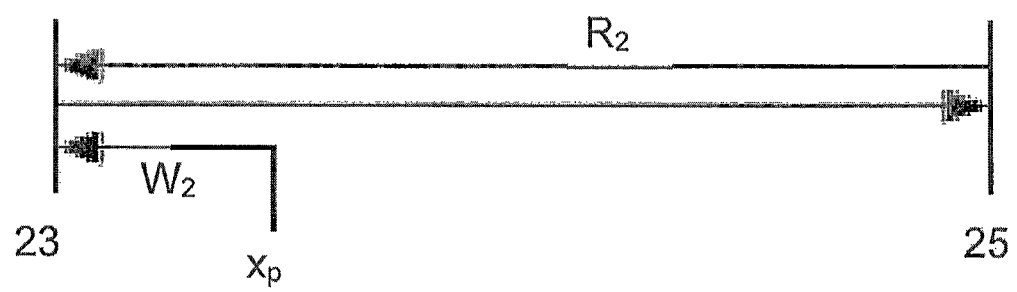
FIG. 2b schematically shows a path of a reflection of a wave which firstly runs towards a detection unit and then towards the damping zone, said path being arranged within the magnetostrictive position measuring device according to FIG. 1.

FIGS. 2a and 2b each show a path of a reflection $R_1$, $R_2$ of one of the mechanical waves $W_1$, $W_2$ (in the following referred to simply as "waves") within the magnetostrictive position measuring device 1. FIG. 2a shows the path of a reflection $R_1$ of the first wave $W_1$ running towards the damping zone 5. As already described, the first wave $W_1$ starts at the position $x_p$ of the position encoder 4 and propagates in the direction of the damping zone 5. At the damper side end 25 of the waveguide 2, it is reflected and the reflection $R_1$ of the first wave $W_1$ propagates towards the detector side end 23 of the waveguide 2. Because the reflection $R_1$ of the first wave $W_1$ runs counter to a movement of the position encoder 4, it is referred to as counter-running reflection $R_1$. It exceeds the position $x_p$ of the position encoder 4 and there, under certain circumstances which will be explained in the following, can interact with the torsional impulse which is generated at a later point in time by the position encoder 4, overlap and run towards the detection unit 3 together. There, the torsional impulse is detected together with the interfering counter-running reflection $R_1$ which leads to deviations in the measured position.

FIG. 2b shows the path of a reflection $R_2$ of the second wave $W_2$ running towards the detection unit 3. The second wave $W_2$ likewise starts at the position $x_p$ of the position encoder 4 and propagates in the direction of the detection unit 3. At the detector side end 23, the second wave $W_2$ is reflected and the reflection $R_2$ of the second wave $W_2$ propagates towards the damper side end 23 of the waveguide 2. Here, at specific frequencies, which are explained in the following, the reflection $R_2$ of the second wave $W_2$ can run synchronously with the movement of the position encoder 4 and thus can have a permanently interfering influence on the measurement if they come to rest below the actual measurement signal of the current measurement. Accordingly, the reflection $R_2$ of the second wave $W_2$ is referred to as co-running reflection $R_2$. Subsequently, the co-running reflection $R_2$ is damped by the damping zone 5 and is in turn reflected at the damper side end 25 of the waveguide.

Figure 3:
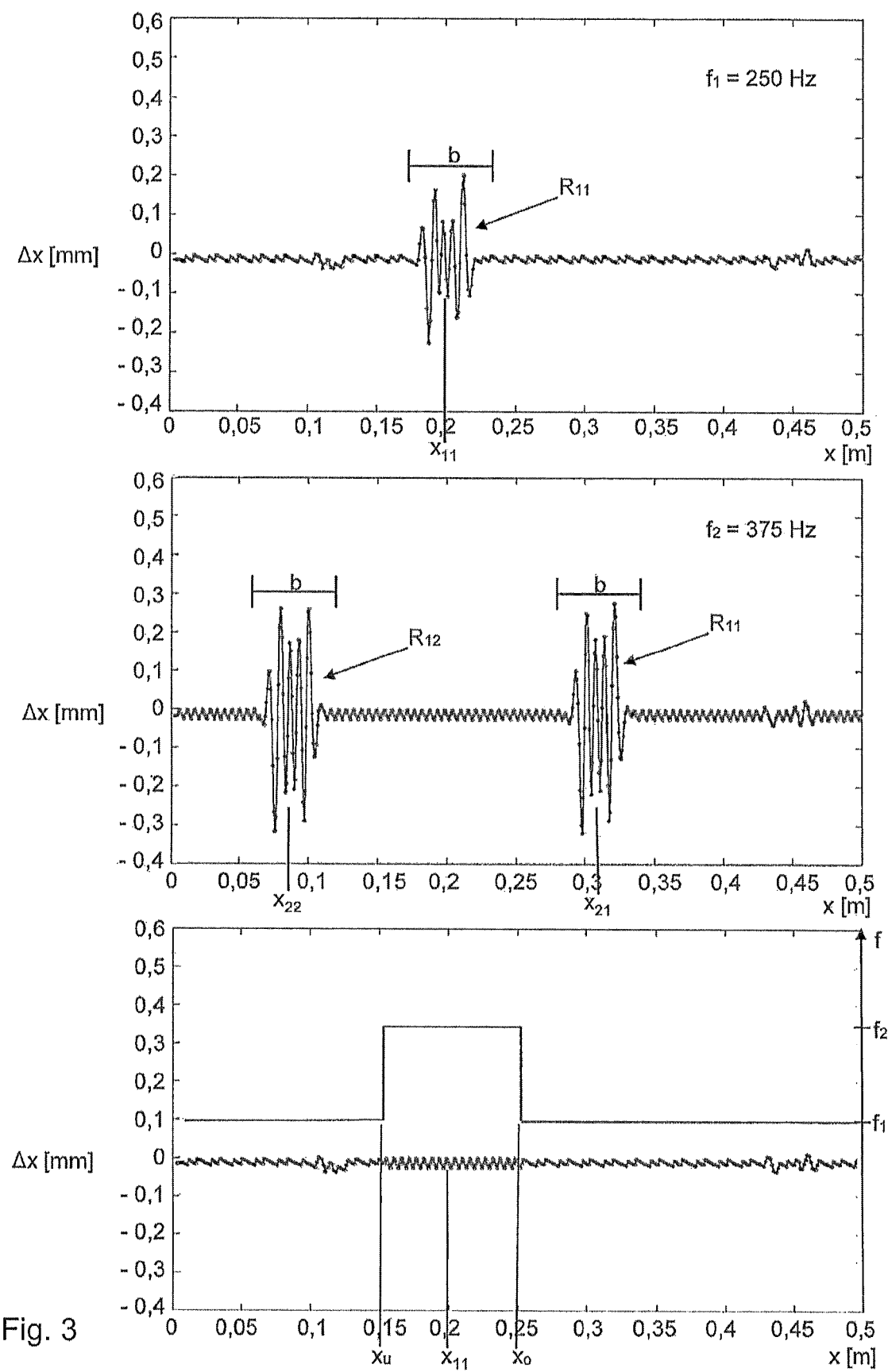
FIG. 3 shows, respectively, a diagram of a position on a measurement section and a deviation from the position for a first clock frequency in the upper diagram, for a second clock frequency in the central diagram and for a switching between the first clock frequency and the second clock frequency in the lower diagram, according to a first embodiment of the invention.

In FIG. 3, the interfering influence of the counter-running reflection $R_{1n}$, which was generated by previous initial pulses IP, is shown. FIG. 3 shows three diagrams in which, respectively, the position x in the measuring range 11 is depicted on their abscissa and a deviation Δx of a shown position is depicted on their ordinate, wherein the deviation Δx is calculated by means of a difference between this position shown and the actual position x on the abscissa. Here, the total nominal length NL of the measuring region 11 of 500 mm is displayed in the diagrams. In the upper diagram, an exemplary first clock frequency $f_1$ of 4250 Hz is depicted. This first clock frequency $f_1$ is in a frequency range of $$\frac{v}{L} > f_1 > \frac{v}{2L}.$$

Still, v refers to the propagation speed of the mechanical waves $W_1$, $W_2$ or the reflections $R_{1n}$, $R_{2n}$ and L refers to the length of the waveguide 2 which results at the nominal length NL of 500 mm in 580 mm. In this frequency range, only a counter-running reflection $R_{11}$ for n=1, i.e. generated by a previous initial pulse IP, occurs within the measuring range 11, whose overlap position $x_{11}$ can be calculated by the formula 1 already seen above, as follows:

$$x_{11} = -\frac{v}{2}\frac{1}{f_1} + L$$

If the stated, predetermined values are inserted, a value of 200 mm is obtained for the overlap position $x_{11}$, as also depicted in the upper diagram.

In the central diagram, an exemplary clock frequency $f_2$ of 6750 Hz is depicted. This second clock frequency $f_2$ is in a frequency range of $$\frac{3v}{2L} > f_2 > \frac{v}{L}$$

(labels identical). In this frequency range, two counter-running reflections $R_{11}$ and $R_{12}$ occur within the measuring range 11 for n=1, i.e. generated by a previous initial pulse IP, and n=2, i.e. generated by a still more previous initial pulse IP, whose overlap positions $x_{21}$, $x_{22}$ can in turn be calculated via Formula 1 as follows:

$$x_{21} = -\frac{v}{2}\frac{1}{f_2} + L \text{ and } x_{22} = -v\frac{1}{f_2} + L$$

If the predetermined values are again inserted for both overlap positions $x_{21}$, $x_{22}$, a value of 326 mm is thus obtained for the first overlap position $x_{21}$ and a value of 73 mm for the second overlap position $x_{22}$, as also depicted in the central diagram. With the counter-running reflection $R_{11}$ for n=1, its overlap position $x_{11}$ at the first clock frequency $f_1$ of 200 mm has accordingly shifted to the first overlap position $x_{21}$ at the second clock frequency $f_2$ of 326 mm. Furthermore, an additional counter-running reflection $R_{12}$ for n=2 with an overlap position $x_{22}$ arises within the measuring range 11.

The counter-running reflections $R_{1n}$—and, as also shown in the following, the co-running reflections $R_{2n}$—do not have any discrete frequencies, but rather cover a frequency band. As depicted in FIG. 3 in the upper and central diagrams, this results in the counter-running reflections $R_{11}$, $R_{12}$ each having a width b around their overlap position $x_{11}$, $x_{21}$, $x_{22}$. Typically, the width b is in a range between 30 mm and 120 mm. In this example, the width b is 50 mm. It can be seen that with this selection of the clock frequencies $f_1$, $f_2$, the overlap positions $x_{11}$, $x_{21}$ of the counter-running reflections $R_{11}$, $R_{12}$ occur in complementary position ranges of the measuring range 11 and, furthermore, also do not intersect the counter-running reflections $R_{11}$, $R_{12}$ in their widths b.

In the lower diagram, a first exemplary embodiment of the invention is illustrated. As well as the deviation $\Delta x$, the clock frequency f used is additionally depicted in this diagram on a second ordinate. In a position range in which, in the upper diagram, no counter-running reflection $R_{11}$ occurs, the first clock frequency $f_1$ is used for measurement. At a lower switch-over point $x_u$, which is 150 mm in this exemplary embodiment, switching takes place from the first clock frequency $f_1$ of 4250 Hz to the larger second clock frequency $f_2$ of 6375 Hz and this second clock frequency $f_2$ is used over the adjoining position range for measurement. It can be seen from the upper diagram that, at the first clock frequency $f_1$, the counter-running reflection $R_{11}$ would occur at the overlap position $x_{11}$ in this position range. By switching to the second clock frequency $f_2$, this counter-running reflection $R_{11}$ is masked out. Subsequently, at an upper switch-over point $x_o$, which is at 250 mm in this exemplary embodiment, switching takes place back from the second clock frequency $f_2$ to the first clock frequency $f_1$ and the measurement is continued with the first clock frequency $f_1$ until the end of the measuring range 11. Here, the counter-running reflection $R_{11}$ is masked outfor the second clock frequency $f_2$, which occurs at the overlap point $x_{21}$ depicted in the central diagram. The lower switch-over point $x_u$ and the upper switch-over point $x_o$ are selected such that, at the first clock frequency $f_1$, the overlap position $x_{11}$, including the width b of the first reflection $r_{11}$, is within the position range which is predetermined by the two switch-over points $x_u$, $x_o$. It should be noted that, when using the first clock frequency $f_1$, the two counter-running reflections $r_{11}$ and $r_{12}$, which—as shown in the central diagram—occur at the second clock frequency $f_2$ at the overlap positions $x_{21}$, $x_{22}$, are likewise masked out.

Figure 4B:
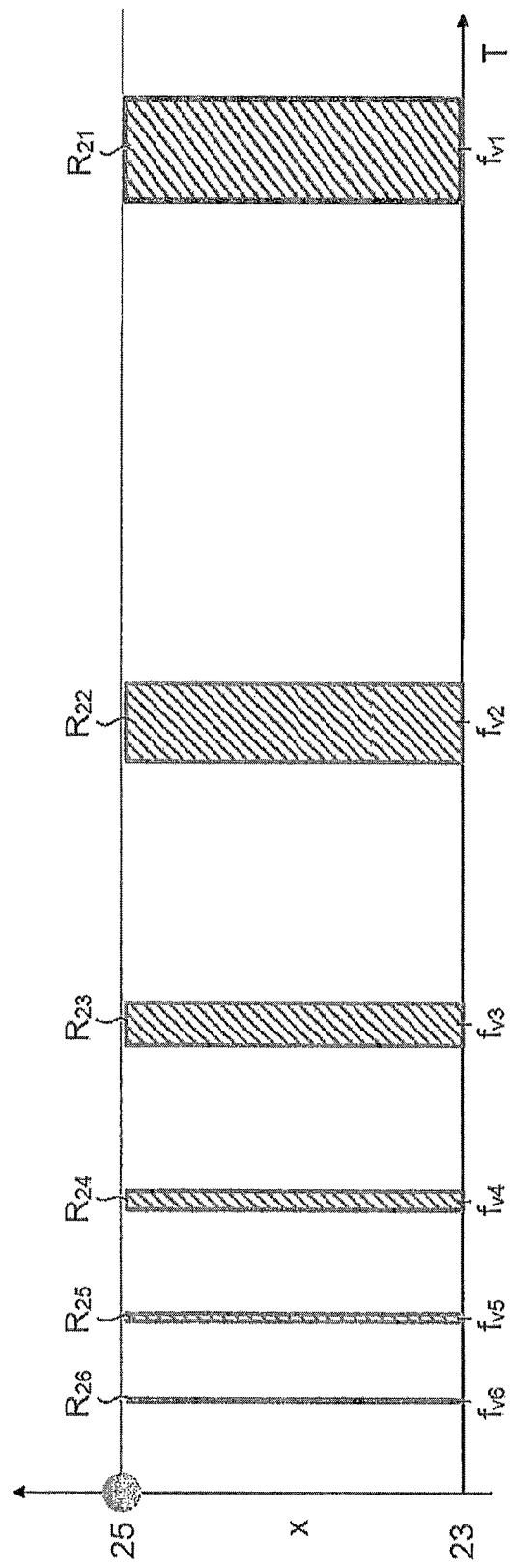
FIG. 4b shows a diagram of the position of the position encoder over the period, in which the overlap positions of the actual measurement signals and the reflections of the wave running towards the detection unit are recorded.

FIGS. 4a to 4d each depict diagrams of the position x of the position encoder 4 on the measurement section over a period T as the inverse of the frequency (T=1/f). Here, interfering counter-running reflections $R_{1n}$ are depicted in FIG. 4a, interfering co-running reflections $R_{2n}$ are depicted in FIG. 4b, and initial interferences $I_n$ are depicted in FIG. 4c. FIG. 4d shows a combination of the diagrams depicted in FIGS. 4a to 4c. On the basis of FIGS. 4a to 4d and the subsequent formulas, the occurrence of the interfering reflections $R_{1n}$, $R_{2n}$ and the initial interferences $I_n$ is depicted.

In the following, the dependency of the overlap positions $x_n$ on the counter-running reflections $R_{1n}$, which is described by using formula 1, is discussed again in detail. As already mentioned, the counter-running reflections $R_{1n}$ have a width distribution or width b with respect to the possible overlap positions $x_n$. The width b is dependent, in particular, on the structural shape of the measurement section, the characteristic of the magnetic field of the position encoder 4 as well as further electrical parameters and the material of the waveguide 2. In order to take into consideration the width b of the counter-running reflections $R_{1n}$, formula 1 is extended to the formulas 1a and 1b depicted in the following:

$$x_n = -\left(\frac{n}{2}\right) \cdot v \cdot \frac{1}{f} + L - \frac{b}{2} \quad \text{(Formula 1a)}$$

$$x_n = -\left(\frac{n}{2}\right) \cdot v \cdot \frac{1}{f} + L + \frac{b}{2} \quad \text{(Formula 1b)}$$

Here, also, $x_n$ represents the overlap position for the n-th counter-running reflection $R_{1n}$, v specifies the propagation speed of the mechanical wave, f the clock frequency and L the length of the measuring section. The last term $$\pm \frac{b}{2}$$

in formulas 1a and 1b represents the width distribution of the overlap positions $x_n$ from which the width b arises. In a first view, the width b is arranged symmetrically around the overlap position $x_n$ and takes the same value for each overlap position $x_n$ and clock frequency f. It is clear that the overlap position $x_n$ is the negative reciprocal of the clock frequency f, if the length L of the waveguide 2 and the width b of the overlap positions $x_n$ are considered as offset.

In FIG. 4a, the dependency expressed by formulas 1, 1a and 1b is depicted again in a diagram. Here, the interfering overlap positions $x_{1n}$ of the counter-running reflections $R_{11}$, $R_{12}$, $R_{13}$, $R_{14}$, $R_{15}$ for the values of n=1 to n=5 are shown with the measurement signal. The period T, which can also be expressed as the reciprocal value of the frequency f, is plotted on the abscissa. The overlap position $x_n$ of the counter-running reflections $R_{1n}$ behaves in a negatively proportional manner relative to the period T, taking into account the offset caused by the length L of the waveguide 2 and the width b of the overlap positions $x_n$. It should be noted that only the counter-running reflections $R_{11}$, $R_{12}$, $R_{13}$, $R_{14}$, $R_{15}$ of the first wave $W_1$, but not the first wave $W_1$ itself, are depicted. Thus, the counter-running reflections $R_{11}$, $R_{12}$, $R_{13}$, $R_{14}$, $R_{15}$ arise in the depiction on the damper side end 25 of the waveguide 2.

The above-mentioned clock frequencies $f_{vn}$ which are to be avoided, at which the co-running reflections $R_{2n}$ of the second wave $W_2$ running towards the detection unit run synchronously with the measurement signal and consequently overlap with it, can be calculated by means of the above-mentioned formula 2. As already described in connection with the counter-running reflections $R_{1n}$, the co-running reflections likewise have no discrete frequencies but rather cover a frequency band. Thus, correspondingly, a width distribution or width b of the co-running reflections $R_{2n}$ is used for their description. In order to take into account the width b of the co-running reflections $R_{2n}$, the previously described formula 2 is extended to the formulas 2a and 2b, depicted in the following:

$$\frac{1}{f_{vn}} = \left(\frac{1}{n}\right) \cdot \frac{2L - \frac{b}{2}}{v} \quad \text{(Formula 2a)}$$

$$\frac{1}{f_{vn}} = \left(\frac{1}{n}\right) \cdot \frac{2L + \frac{b}{2}}{v} \quad \text{(Formula 2b)}$$

Here, also, $f_{vn}$ depicts the clock frequency to be excluded for the n-th co-running reflection $R_{2n}$, v specifies the propagation speed of the mechanical wave and L the length of the measurement section. The width distribution is depicted in formulas 2a and 2b in turn by the term $$\pm \frac{b}{2},$$

from which the width b arises. It is clear that the time range of the period T which is covered, as the inverse of the frequency, is smaller for a larger n with a constant width b of the co-running reflection $R_{2n}$.

In FIG. 4b, the dependency expressed by the formulas 2, 2a and 2b of the clock frequency $f_{vn}$ to be excluded is depicted again in the diagram. Here, the interfering co-running reflections $R_{21}$, $R_{22}$, $R_{23}$, $R_{24}$, $R_{25}$, $R_{26}$ are shown for the values of n=1 to n=6. The period T, which can also be expressed as the inverse of the frequency, is plotted on the abscissa, as already depicted in formulas 2, 2a and 2b. For the example described here, with a length L of the waveguide 2 of 580 mm and a propagation speed v of 2830 m/s, the following values arise for the clock frequencies $f_{vn}$ to be excluded for the co-running reflections $R_{21}$, $R_{22}$, $R_{23}$, $R_{24}$, $R_{25}$, $R_{26}$: $f_{v1}$=2785 Hz, $f_{v2}$=5570 Hz, $f_{v3}$=8355 Hz, $f_{v4}$=11140 Hz, $f_{v5}$=13925 Hz and $f_{v6}$=16710 Hz.

FIG. 4c shows, in the diagram, a dependency of initial interferences $I_n$ when the initial pulse IP is generated. The initial interference $I_1$ for n=1 represents the case that the second wave triggered during a previous measurement has not yet reached the detection unit 3 during the current measurement and consequently, can interfere with a newly triggered wave $W_1$, $W_2$. The initial interference $I_2$ for n=2 represents the corresponding case for a still more previous measurement. The coil 31 (or the piezoelectric measuring element) of the detection unit 3 cannot detect the second wave $W_2$ when the initial pulse IP generates the circular magnetic field within the waveguide 2. This case occurs predominantly with high clock frequencies f and with positions x close to the damping zone 5.

Overlap positions $x_{In}$ of the initial interference $I_n$ can be calculated by means of the following formula 3:

$$x_{In} = n \cdot v \cdot \frac{1}{f} \quad \text{(Formula 3)}$$

Here, $x_{In}$ represents the overlap position for the n-th initial interference $I_n$, v specifies the propagation speed of the mechanical wave and f the clock frequency. At these overlap positions $x_{In}$, no detection takes place, because a new initial pulse IP is then triggered. The initial pulse IP has a certain length, including a potential post-oscillation duration. A width $b_I$ of the initial interference $I_n$ thus results, which here is added asymmetrically to the overlap position of the initial interference $I_n$, as shown in Formula 3a:

$$x_{In} = n \cdot v \cdot \frac{1}{f} + b_I \quad \text{(Formula 3a)}$$

In FIG. 4c, two initial interferences $I_1$, $I_2$ for the values n=1 and n=2 are recorded. These arise in this depiction on the detector side end 23 of the waveguide 2 and behave proportionally relative to the period T. As already described, these initial interferences $I_1$, $I_2$ represent ranges in which no measurement is possible.

In FIG. 4d, the diagrams of FIGS. 4a to 4c are depicted in a common diagram. Hereby, the interfering counter-running reflections $R_{1n}$, the interfering co-running reflections $R_{2n}$ as well as the initial interferences $I_n$ can be compared with one another. The regions within the diagram which are covered neither by one of the two interfering reflections $R_{1n}$ $R_{2n}$ nor by the initial interferences $I_n$ can be used for measurements.

Figure 5:
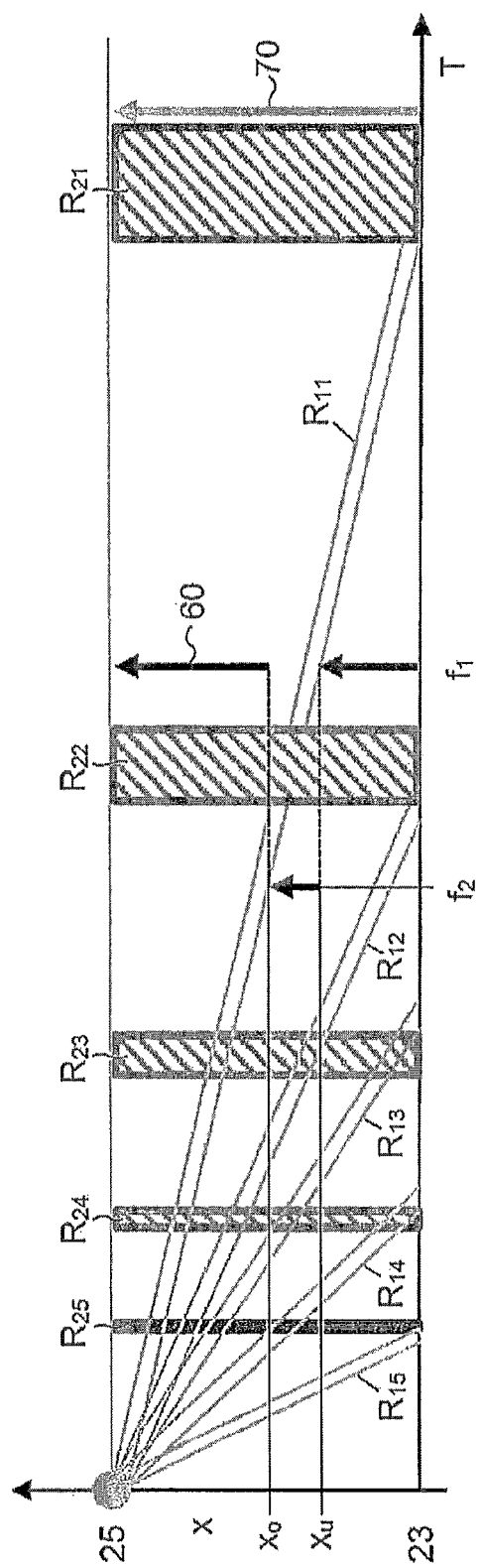
FIG. 5 shows the switching between the first clock frequency and the second clock frequency according to the first embodiment of the invention, depicted on the basis of the diagram from FIG. 4d.

In FIG. 5, the first embodiment which is already depicted in FIG. 3 is depicted on the basis of the diagram from FIG. 4d. The measurement 60 is recorded in the diagram in the form of arrows. Because the clock frequencies f used in the first exemplary embodiment are far below the frequency range which is relevant for the initial interferences $I_n$ and for the co-running reflections $R_{26}$ for n=6, they have not been depicted for clarity. Initially, measurement takes place from the detector side end 23, beginning with the first clock frequency $f_1$. Even before the measurement 60 reaches a position x at which the counter-running reflection $R_{11}$ for n=1 would overlap in an interfering manner, the switch according to the invention to the second clock frequency $f_2$ takes place at the lower switch-over point $x_u$. Thus, at least the counter-running reflection $R_{11}$ for n=1 is masked out. The second clock frequency $f_2$ is selected to be larger than the first clock frequency $f_1$, in particular 1.5 times as large. One the one hand, the measurement 60 is thus operated with the higher second clock frequency $f_2$, and on the other hands it is clear from the diagram that a lower frequency, i.e. a shift to larger periods T on the abscissa, can disadvantageously lead to the reflection generated by the second clock frequency $f_2$ coming to rest within the width b of the counter-running reflection $R_{11}$ for n=1 and thus interfering with the measurement. Additionally, the second clock frequency $f_2$ must be selected such that it is located remotely from the clock frequencies $f_{vn}$ to be avoided or excluded, including their width b, the co-running reflections $R_{2n}$ running synchronously with the measurement signal at said clock frequencies. These clock frequencies $f_{vn}$ can be calculated, as already explained, from formula 2, 2a or 2b, and also should not be used for measurement with the switching according to the invention of the clock frequencies f, because the co-running reflections $R_{2n}$ would interfere with the measurement signal. As already mentioned in connection with FIG. 3, in this first exemplary embodiment the first clock frequency $f_1$ is 4250 Hz and the second clock frequency $f_2$ is 6375 Hz. For the co-running reflection $R_{22}$ for n=2, the clock frequency $f_{v2}$ to be excluded is 5300 Hz.

At the upper switch-over point $x_o$, still before the measurement 60 reaches a position x at which the counter-running reflection $R_{11}$ for n=1 would likewise overlap in an interfering manner, a new switch takes place from the second clock frequency $f_2$ back to the first clock frequency $f_1$. Thus, the interfering counter-running reflection $R_{11}$ for n=1 is masked out. The measurement 60 is then carried out over the remaining measuring range with the first clock frequency $f_1$. As a result, only two different clock frequencies $f_1$, $f_2$, between which switching takes place twice (one time switched over, one time back) are required in this embodiment, in order to perform the measurement 60 over the complete measuring range 11. It can likewise be interpreted that, with the initial use of the first clock frequency $f_1$, before reaching the lower switch-over point $x_u$, all counter-running reflections $R_{1n}$ for n>1 are masked out. In the following, a table 1 is depicted for this first embodiment, from which the values for the switch-over point can be read out, too. The table is implemented as a look up table. Table 1 shows positions x of the measuring range 11 to which the clock frequencies f are respectively assigned.

TABLE 1

| Positions x in mm | Clock frequencies f in Hz |
|---|---|
| 0-149.99 | 4250 |
| 150-249.99 | 6375 |
| 250-500 | 4250 |

Furthermore, a conventional measurement 70 is depicted in FIG. 5 for comparison, in which the switch according to the invention between the clock frequencies f is not carried out. From FIG. 5 it can be derived that such a conventional measurement 70 with a waveguide 2 which has a nominal length NL of 500 nm can only be carried out with a conventional clock frequency $f_h$ of a maximum of 2200 Hz, which is thus vastly smaller than the first clock frequency $f_1$.

In order to obtain as high as possible a first clock frequency $f_1$ for the measurement within the frequency range $$\frac{v}{L} > f_1 > \frac{v}{2L},$$

the first clock frequency $f_1$ is preferably selected to be close to the upper limit $$\frac{v}{L},$$

wherein, however, a safety distance which corresponds to the width b of the co-running reflection $R_{22}$ for n=2 is maintained. By means of the safety distance, the first clock frequency $f_1$ is prevented from being selected such that the measurement signal overlaps with one of the co-running reflections $R_{2n}$ in an interfering manner. Here, the first clock frequency $f_1$ can be expressed as follows:

$$f_1 = \frac{2v}{2L+b}$$

Analogously, the second clock frequency $f_2$ can be selected to be close to the upper limit $$\frac{3v}{2L}$$

of the frequency range $$\frac{3v}{2L} > f_2 > \frac{v}{L},$$

wherein here a safety distance is also maintained in the same way. The second clock frequency $f_2$ can be expressed as follows:

$$f_2 = \frac{3v}{2L+b}$$

If the precisely calculated first clock frequency $f_1$ is inserted into formula 1 for the overlap points $x_n$ of the counter-running reflection $R_{11}$ for n=1, the following overlap point $x_{11}$ is obtained:

$$x_{11} = \frac{1}{2}L - \frac{b}{4}$$

The lower switch-over point $x_u$ and the upper switch-over point $x_o$ are selected in this embodiment of the invention independently of this overlap point $x_{11}$ by the width b being subtracted from the overlap point $x_{11}$ to obtain the lower switch-over point $x_u$ and the width b being added to the overlap point $x_{11}$ in order to obtain the upper switch-over point $x_o$:

$$x_u = \frac{1}{2}L - \frac{5b}{4} \text{ and } x_o = \frac{1}{2}L + \frac{3b}{4}$$

These calculations can be used to determine an assignment of the two cross-over points $x_u$ and $x_o$ to the corresponding clock frequencies $f_1$ and $f_2$.

Furthermore, it should be mentioned that the first clock frequency $f_1$ and the second clock frequency $f_2$ are at a ratio of 2:3 and thus the second clock frequency $f_2$ is 1.5 times the first clock frequency $f_1$. Hence, a synchronous output is enabled, as described in the following in connection with FIG. 8.

In the following table 2, the highest possible first clock frequencies $f_1$ within the frequency range $$\frac{v}{L} > f_1 > \frac{v}{2L}$$

and the highest possible second clock frequencies $f_2$ within the frequency range $$\frac{3v}{2L} > f_2 > \frac{v}{L},$$

as calculated above, are shown for different nominal lengths NL and the resulting lengths L of the waveguide 2. The length L is calculated from the nominal length NL, as already described, by the length of the coil 31 on the waveguide 2 (or the length of the vertical strip or the length of the piezoelectric measuring element) and the length of the damping zone 5 being added, which are assumed to be 80 mm in this example. The width b is assumed to be 60 mm and also, correspondingly, the safety distance. Additionally, the lower switch-over points $x_u$ and upper switch-over points $x_o$ which are calculated from this are recorded. For comparison, a column is additionally shown, in which the maximum possible conventional clock frequency $f_h$ for this nominal length NL is specified, at which no switching between the clock frequencies f takes place.

TABLE 2

| NL (mm) | L (mm) | $f_1$ (Hz) | $f_2$ (Hz) | $x_u$ (mm) | $x_o$ (mm) | $f_h$ (Hz) |
|---|---|---|---|---|---|---|
| 500 | 580 | 4623 | 6934 | 215 | 335 | 2200 |
| 1000 | 1080 | 2541 | 3811 | 465 | 585 | 1200 |
| 2000 | 2080 | 1336 | 2005 | 965 | 1085 | 660 |
| 4000 | 4080 | 686 | 1029 | 1965 | 2085 | 340 |
| 7800 | 7880 | 357 | 535 | 3865 | 3985 | 180 |

This table 2 can be used to read out the assignment of the two switch-over points $x_u$ and $x_o$ to the corresponding clock frequencies $f_1$ and $f_2$. In general, a switching hysteresis can be provided during the assignment of the switch-over points $x_u$ and $x_o$. This means that the lower switch-over point $x_u$ is selected with a slightly larger position x when the position encoder 4 is displaced in the direction of larger positions x, and the lower switch-over point $x_u$ is selected with a slightly smaller position when the position encoder 4 is displaced from larger positions x in the direction of smaller positions x. This applies analogously for the upper switch-over point $x_o$. It is thus achieved that, when the position encoder 4 is located exactly at the switch-over point $x_u$, $x_o$, constant switching between the clock frequencies f, although the position encoder does not move, is prevented. Switching between the clock frequencies f although the position encoder 4 does not move would lead to higher-order reflections constantly being displaced, which is noticeable during the measurement in an increased noise of the measured value of position x.

It is clear that by means of the switching according to the invention between two clock frequencies $f_1$, $f_2$, the lower first clock frequencies $f_1$ are already approaching being twice as large in comparison to the maximum possible conventional clock frequencies $f_h$, at least for the nominal lengths NL depicted here. This effect can be further strengthened when the first clock frequency $f_1$ is selected in an even higher frequency range. Here, however, further counter-running reflections $R_{1n}$ as well as, possibly, initial interferences $I_n$ are to be expected, which must be taken into account at higher frequencies. Consequently, it is usually not possible to mask out the interfering counter-running reflections $R_{1n}$ as well as possibly the initial interferences $I_n$ over the entire measuring range 11 merely by switching between only two clock frequencies $f_1$, $f_2$. Therefore, further clock frequencies f in higher frequency ranges are provided, between which switching takes place.

In FIGS. 6a and 6b, a second and a third embodiment of the invention, in which at least the first clock frequency $f_1$ is within the frequency range $$\frac{2v}{L} > f_1 > \frac{3v}{2L}$$

and at least the second clock frequency $f_2$ is within the frequency range $$\frac{5v}{2L} > f_1 > \frac{2v}{L}$$

for the nominal length NL of the measuring range 11 of 500 mm, are depicted using a sub-region of FIG. 4d in which the co-running reflection $R_{21}$ for n=1 is not shown for depiction reasons. Here, the first clock frequency $f_1$, which is used initially, is 9000 Hz. In the second embodiment, a measurement 61 shown in FIG. 6a is performed, in which five different clock frequencies f are used in total, between which switching takes place five times. The positions x of the measuring range 11 and the assigned clock frequencies f which are used can be read from the following table. It is clear that, here, lower clock frequencies f than the initially used first clock frequency $f_1$ can also be used, e.g. 9000 Hz or 9800 Hz.

TABLE 3

| Positions x in mm | clock frequency f in Hz |
|---|---|
| 0-199.99 | 10200 |
| 200-219.99 | 11000 |
| 220-259.99 | 10200 |
| 260-319.99 | 9000 |
| 320-339.99 | 12200 |
| 340-500 | 9800 |

The assignments depicted in table 1 and table 3 of the positions x of the measuring range 11 relative to the clock frequencies f which are used can also be generated on the basis of customer-specific requirements. Here, in specific measurement portions, the highest possible clock frequencies f are used in order to provide special measuring portions having a high dynamic range.

In FIG. 6b, in the third embodiment, an alternative measurement 62 to the measurement 61 of the second embodiment is shown, in which the same first clock frequency $f_1$ is initially used. In this alternative measurement, the first clock frequency $f_1$ is smaller than all further clock frequencies f used. Here, the further clock frequencies f are all in the frequency range $$\frac{5v}{2L} > f > \frac{2v}{L}$$

and are selected such that they are as close to the upper limit $$\frac{5v}{2L}$$

as possible. It is thus achieved that, in this measurement 62, the clock frequencies f used are always greater than or equal to the first clock frequency $f_1$ and thus, seen relative to the measurement 61 of the second embodiment over the entire measuring range, are even higher. However, switching between the clock frequencies f takes place seven times in this exemplary embodiment. It should be noted that at higher frequency ranges, the search for suitable clock frequencies fat which switching can take place—depicted in the diagram by the free areas between the reflections $R_{1n}$, $R_{2n}$ as well as the initial interference $I_n$—requires a significantly higher computational effort.

In particular, in the cases described above in which a plurality of switches between the clock frequencies f are performed, it can be provided that the assignment of the positions x to the clock frequencies f, as depicted in the diagrams of FIGS. 6a and 6b or in Table 3, is determined during a calibration. It can also be provided that a metrological determination is carried out by means of a frequency sweep at several positions x.

An increase in the effective clock frequency f over the entire measuring range 11 in comparison to conventional clock frequencies $f_h$ of up to approximately three to four times is possible for the cases described above by means of the method according to the invention.

Figure 7:
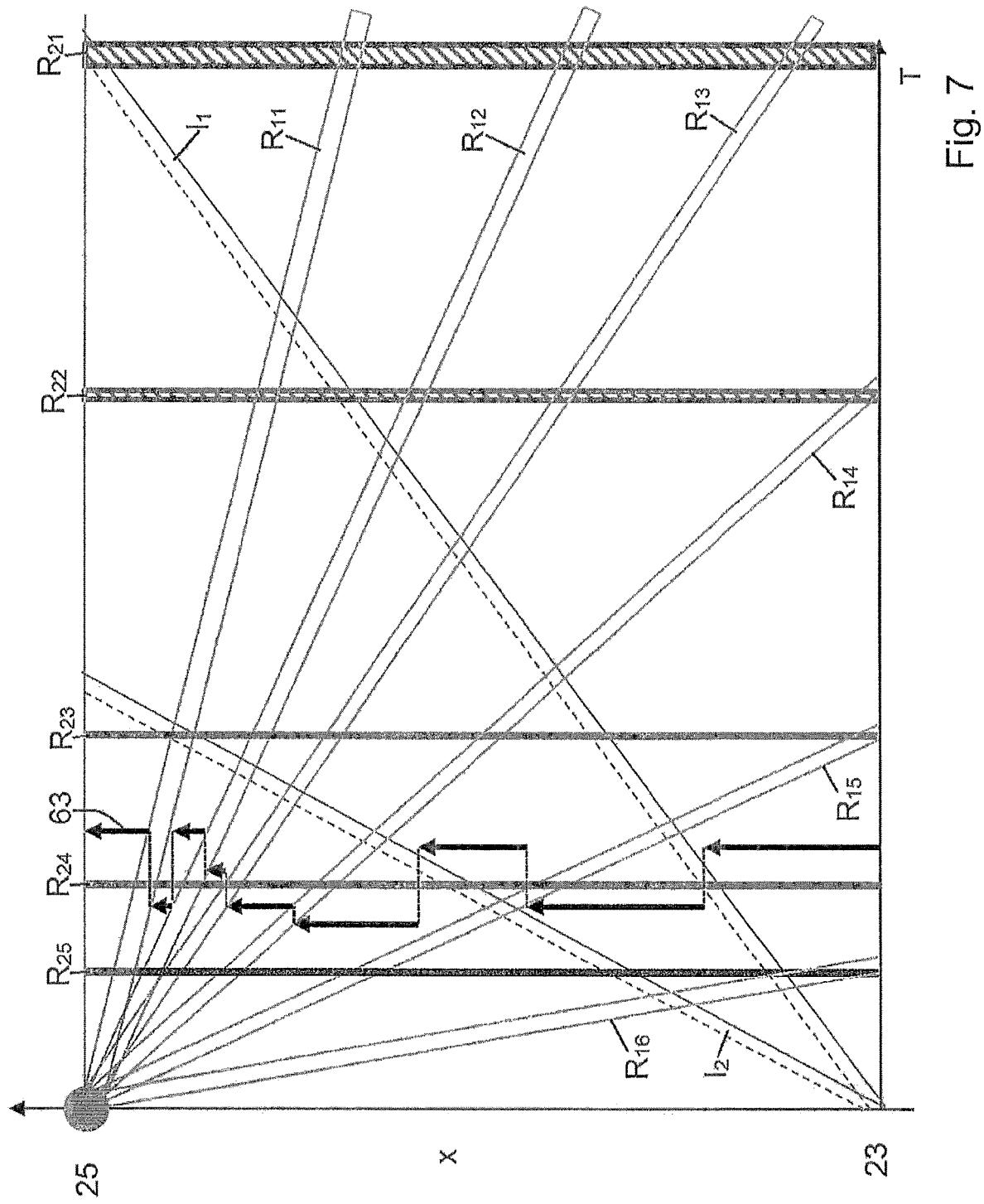
FIG. 7 shows the switching between nine clock frequencies according to a fourth embodiment of the invention for a magnetostrictive position measuring device designed to be extended, depicted again on the basis of a diagram corresponding to FIG. 4d.

FIG. 7 refers to a measuring range 11 whose nominal length NL is 1000 mm. The width b, both of the counter-running reflections $R_{1n}$ and the co-running reflections $R_{2n}$, is independent of the length L of the waveguide and thus also of the nominal length NL. The maximum clock frequency f can consequently be selected independently of the length L. However, according to formula 1 or formula 2, the overlap positions $x_n$ of the counter-running reflections $R_{1n}$ and the forbidden frequencies $f_{vn}$ are dependent on the length L of the measuring section due to the co-running reflections $R_2$. As a result, with larger nominal lengths NL of the measuring range 11 or larger lengths L of the waveguide 2, a larger of interfering reflections $R_{1n}$, $R_{1n}$ have to be considered. A fourth embodiment of the invention is depicted in FIG. 7 as measurement 63. It should be noted that, because of the large number of interfering reflections $R_{1n}$, $R_{2n}$, above all of the counter-running reflections $R_{2n}$, a plurality of switchings, in this example eight, are performed between the clock frequencies f.

Nonetheless, the method according to the invention is also effective with larger lengths L of the waveguide 2, because, for example, with a length L of 7800 mm, the effective clock frequency f over the entire measuring range 11 can be increased by 20 times in comparison to conventional clock frequencies $f_h$.

FIG. 8 shows in a diagram, in the upper part, a bus clock $f_B$ for driving the magnetostrictive position measuring device 1, in which the measurement values of the position x can be output, in the central part, an internal clock of the magnetostrictive position measuring device 1 for the initial pulse IP and, in the lower part, measurement runs M which have been performed, respectively, at the first clock frequency $f_1$ and the second clock frequency $f_2$. The measurement values which are determined at the two clock frequencies $f_1$ and $f_2$ during the measurement run M are added up, saved and output in a bus-synchronous manner. In this example, the clock rate $f_B$ of the bus corresponds to the first clock frequency $f_1$ of 4000 Hz and is not changed. The initial pulse IP is initially started with the first clock frequency $f_1$ and runs synchronously with the clock rate $f_B$ of the bus. Each time, when the initial pulse is started, the clocking of the bus also takes place and the measured values which are determined from the measurement run M which has been previously carried out are output 80 simultaneously by the bus.

Then, the clock frequency $f_1$ is switched to the clock frequency $f_2$ which is 6000 Hz. Consequently, the measurement run M ends and the subsequent initial pulse IP is already started before the next clocking of the bus takes place, in which the measured values are then output 81 by the bus. In this exemplary embodiment, the output 81 of the measured value takes place for the first time delayed by 250 µs at the end of the previous measurement run M. Subsequently, two measurement runs M are fully finished before the next clocking of the bus takes place. It is provided that the measured values of the (two) measurement runs M are averaged 82 and the averaged measurement values are output 83 in the next clocking of the bus.

What is claimed is:

1. A method for operating a magnetostrictive displacement measuring device (1) having a waveguide (2) for guiding at least one mechanical wave ($W_1$, $W_2$), having at least one damping zone (5), having a magnetic position encoder (4) which is displaceably arranged along a measuring range (11) of the position measuring device (1) and having a detection unit (3), wherein the at least one mechanical wave ($W_1$, $W_2$) is generated by means of an excitation signal (IP) having a clock frequency (f), wherein at least two mechanical waves ($W_1$, $W_2$) having respectively different clock frequencies ($f_1$, $f_2$, f) are generated, wherein the clock frequencies ($f_1$, $f_2$, f) can be predetermined such that interfering reflections ($R_{1n}$, $R_{2n}$) occur at different positions ($x_n$) of the measuring range (11) of the displacement measurement device (1), and, during the procedure of the position encoder (4), switching takes place between the different clock frequencies ($f_1$, $f_2$, f) along the measuring range (11), such that the interfering reflections ($R_{1n}$, $R_{2n}$) at the respective different positions ($x_n$) of the measuring range (11) are masked out.

2. The method according to claim 1, wherein respective switch-over points ($x_u$, $x_o$) of the measuring range (11) at which switching between the at least two different clock frequencies ($f_1$, $f_2$, f) takes place are assigned to the corresponding clock frequencies ($f_1$, $f_2$, f).

3. The method according to claim 2, wherein the assignment of the respective switch-over points ($x_u$, $x_o$) to corresponding clock frequencies ($f_1$, $f_2$, f) is determined from a functional relationship.

4. The method according to claim 2, wherein the assignment of the respective switch-over points ($x_u$, $x_o$) to the corresponding clock frequencies ($f_1$, $f_2$, f) is read out from a table.

5. The method according to claim 2, wherein the assignment of the respective switch-over points ($x_u$, $x_o$) to the corresponding clock frequencies ($f_1$, $f_2$, f) is determined by means of a diagram.

6. The method according to claim 2, wherein the assignment of the respective switch-over points ($x_u$, $x_o$) to the corresponding clock frequencies ($f_1$, $f_2$, f) is determined by a calibration of the magnetostrictive displacement device (1) before a measurement.

7. The method according to claim 2, wherein the assignment of the respective switch-over points (x, xo) to the corresponding clock frequencies ($f_1$, $f_1$, f) is determined by means of an algorithm.

8. The method according to claim 1, wherein switching takes place from a first clock frequency ($f_1$) to a second clock frequency ($f_2$) which is larger than the first clock frequency ($f_1$).

9. The method according to claim 1, wherein at least one initial interference ($I_n$) is taken into account during switching of the clock frequencies ($f_1$, $f_2$, f), measurement being unable to take place during the excitation signal (IP) in the event of said initial interference.

10. The method according to claim 1, wherein, when several interfering reflections ($R_{1n}$) occur at positions ($x_n$) of the measuring range (11) of the position measuring device (1), further clock frequencies (f) are provided, between which switching takes place.

11. The method according to claim 1, wherein a first clock frequency ($f_1$) is in a frequency range of $$\frac{v}{L} > f_1 > \frac{v}{2L},$$

wherein L represents a length of the waveguide (2) and v represents the speed of the mechanical wave ($W_1$, $W_2$).

12. The method according to claim 11, wherein the first clock frequency ($f_1$) is closer to $$\frac{v}{L}$$

than to $$\frac{v}{2L}.$$

13. The method according to claim 12, wherein a safety range is provided between the first clock frequency ($f_1$) and $$\frac{v}{L}.$$

14. The method according to claim 11, wherein a second clock frequency ($f_2$) is in a frequency range of v/L>f2>v/2L, wherein L represents a length of the waveguide (2) and v represents the speed of the mechanical wave (W1, W2).

15. The method according to claim 14, wherein the second clock frequency ($f_2$) is closer to $$\frac{3v}{2L}$$

than to $$\frac{v}{L}.$$

16. The method according to claim 15, wherein the second clock frequency ($f_2$) is 1.5 times the first clock frequency ($f_1$).

17. The method according to claim 15, wherein a safety range is provided between the second clock frequency ($f_2$) and $$\frac{3v}{2L}.$$

18. The method according to claim 1, wherein measured values detected at all clock frequencies ($f_1$, $f_2$) are added up, saved and output in a bus-synchronous manner.

19. The method according to claim 1, wherein when a clock frequency ($f_1$, $f_2$, f) is larger than a bus clock ($f_B$) for driving the magnetostrictive position measuring device (1), the measurement is averaged (82) and the averaged measured value is output (83) only in a delayed manner, during the next clocking of the bus.

20. A computer program which is configured to perform each step of the method according to claim 1.

21. A machine-readable storage medium on which a computer program according to claim 20 is stored.

22. A computing device which is configured to operate a magnetostrictive position measuring device (1) by means of a method according to claim 1.

* * * * *

UNITED STATES PATENT AND TRADEMARK OFFICE
CERTIFICATE OF CORRECTION

Page 1 of 1

PATENT NO.         : 10,697,808 B2
APPLICATION NO.    : 16/034620
DATED              : June 30, 2020
INVENTOR(S)        : Zern et al.

It is certified that error appears in the above-identified patent and that said Letters Patent is hereby corrected as shown below:

In the Claims

In Claim 14, (Column 21, Line 41), please change "$v/L > f_2 > v/2L$" to -- $3v/2L > f_2 > v/L$ --.

Signed and Sealed this
Eleventh Day of August, 2020

Andrei Iancu
*Director of the United States Patent and Trademark Office*